July 8, 1941.                A. D. NASH                    2,248,717
                     PREPARATION OF SHEET GLASS
                         Filed Dec. 3, 1937

INVENTOR.
ARTHUR D. NASH
BY
ATTORNEYS.

Patented July 8, 1941

2,248,717

UNITED STATES PATENT OFFICE 2,248,717

PREPARATION OF SHEET GLASS

Arthur D. Nash, Sewickley, Pa., assignor to Pittsburgh Plate Glass Company, a corporation of Pennsylvania Application December 3, 1937, Serial No. 177,885

2 Claims. (Cl. 49—83.1)

This invention relates to the manufacture of glass and more particularly to the production of a translucent glass.

In the preparation of translucent glass, it has been the practice to prepare ordinary transparent glass and apply a sand blast to the surface of the glass to roughen it and make the glass non-transparent. The surface produced in this manner is rough and difficult to clean and the production of such glass requires an additional operation after the article of glass has been formed.

It is an object of my invention to produce a glass of improved useful and ornamental characteristics. Another object is to produce a glass which is colored to give the desired effect. It is a further object to provide an improved process for producing such glass. Other objects will become apparent.

I have found that by drawing glass having numerous bubbles suspended in it, these bubbles will be elongated and will give a translucent finished glass having smooth surfaces.

Figure 1:
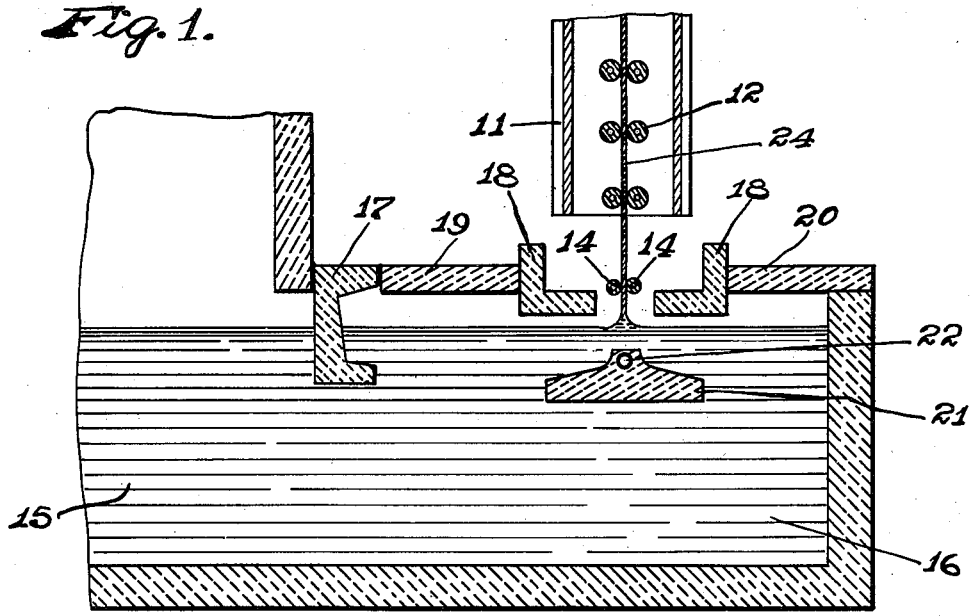
Figure 2:
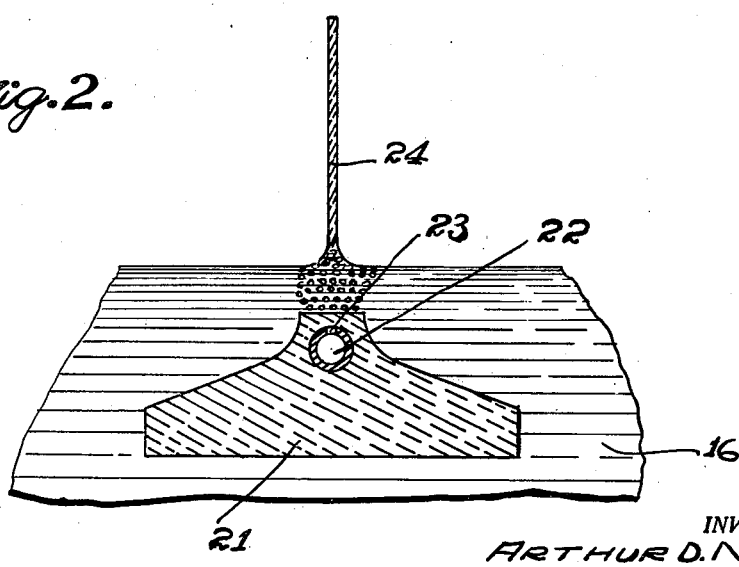

In the drawing, Figure 1 is a fragmentary sectional view of apparatus for making flat glass by a continuous drawing operation, and Figure 2 is an enlarged section through the draw-bar of Figure 1.

In this structure, 15 is the usual melting tank and 16 is the forehearth, 17 being a skim bar, 18, 18 L blocks and 19, 20 cover members. Above the forehearth is a Fourcault leer for drawing a glass sheet 24 from the bath, such leer comprising a casing 11, provided with pairs of driven rolls 12 which grip the sides of the sheet. The glass sheet is cut into sections as it emerges from the top of the leer in accordance with sheet glass practice. The clay draw bar 21 which functions to define the line of draw of the sheet and give a cooler body of glass thereabove than in the body of the forehearth as is well known in the sheet drawing art, has extending therethrough a metal pipe 22 provided along its upper side with small perforations 23. The pipe extends through the side wall of the tank and in operation steam is supplied thereto under pressure. The steam passing through the perforations 23 makes its way through the porous structure of the clay and into the glass at the base of the sheet 24, thus providing the fine bubbles which are elongated in the lower portion of the sheet as it stretches in the drawing operation. A small volume of water might be substituted for the steam, and would have the same effect, as it would be vaporized instantly by the heat of the draw-bar, but the steam is preferable because more easily handled and less liable to injure the draw-bar and unduly chill it. Air might also be used, but is less suitable than steam as the bubble effect is less and the penetration through the clay, in order to produce the very fine bubbles required, is much slower.

The glass in sheet form is suitable for a wide variety of uses, where light is desirable, but clear vision is unnecessary or in conjunction with ordinary plate and window glass for giving ornamental effects and to give clear vision for a portion of a glazed area. If set with the grain horizontal, the light passing through the glass will be directed back into a room horizontally to give improved lighting in portions of the room remote from the window, thus permitting its use in place of prism glass. It also has a field of use in signs in which the insignia are placed on the side next to a source of illumination (by painting, etching, or the like) and in which the sign is invisible when the light is cut off. It is further useful as backgrounds for store windows, in partitions and door panels and for ornamental effects in connection with mirrors to accentuate light reflection.

What I claim is:

1. A method of forming a glass sheet which consists in drawing it continuously from a molten bath and liberating steam into the glass bath beneath and along the line of draw of the sheet during the drawing operation.

2. A method of forming a glass sheet which consists in drawing it continuously from a molten bath above a draw bar, and liberating steam through the material of the draw bar beneath the line of draw of the sheet throughout the length of the draw-bar during the drawing operation so that bubbles are formed in the glass drawn into the sheet.

ARTHUR D. NASH.